United States Patent [19]
Rippetoe et al.

[11] Patent Number: 5,482,629
[45] Date of Patent: Jan. 9, 1996

[54] METHOD AND APPARATUS FOR SEPARATING PARTICLES FROM LIQUIDS

[75] Inventors: William W. Rippetoe, Bixby, Okla.; David N. Shroff, 2601 W. Iola, Broken Arrow, Okla. 74112

[73] Assignee: Universal Environmental Technologies, Inc., Naples, Fla.

[21] Appl. No.: 350,849

[22] Filed: Dec. 7, 1994

[51] Int. Cl.$^6$ ............ B01D 17/04; B01D 35/02; B01D 29/03; B01D 29/31
[52] U.S. Cl. ............ 210/448; 210/451; 210/452; 210/457; 210/DIG. 5; 204/302
[58] Field of Search ............ 210/457, 708, 210/799, 446, 448, 451, 452, DIG. 5; 204/302

[56] References Cited

U.S. PATENT DOCUMENTS

| | | |
|---|---|---|
| 3,610,421 | 1/1970 | Gurney . |
| 3,928,241 | 12/1975 | Buunu et al. . |
| 3,980,565 | 9/1976 | Fowler . |
| 3,992,295 | 11/1976 | Box, Jr. et al. . |
| 4,268,399 | 5/1981 | Box, Jr. et al. . |
| 4,292,181 | 9/1981 | Li et al. . |
| 4,395,464 | 7/1983 | Panchanathan et al. . |
| 4,606,828 | 9/1986 | Wells . |
| 4,671,351 | 6/1987 | Rappe . |
| 4,713,159 | 12/1987 | Truitt et al. . |
| 4,717,480 | 1/1988 | Akedo et al. . |
| 4,741,386 | 5/1988 | Rappe . |
| 4,758,346 | 7/1988 | Johnson . |
| 4,832,837 | 5/1989 | Frederick et al. . |
| 4,904,390 | 2/1990 | Schweighofer et al. . |
| 5,017,294 | 5/1991 | Durrieu . |
| 5,048,499 | 9/1991 | Daywalt . |
| 5,197,446 | 3/1993 | Daywalt et al. . |
| 5,198,118 | 3/1993 | Heskett . |
| 5,209,838 | 5/1993 | Sleppy et al. . |
| 5,225,073 | 7/1993 | Billiet et al. . |
| 5,344,606 | 9/1994 | Brimmer . |

*Primary Examiner*—Neil McCarthy
*Attorney, Agent, or Firm*—Merrill N. Johnson

[57] ABSTRACT

Method and apparatus for separating immiscible solid or liquid particles such as oil from a liquid-based mixture or emulsion. The apparatus consists of two spaced apart concentric elongated metal cylinders. The wall of the innermost cylinder contains a multiplicity of spaced apart radially bored holes and its exit end is capped. The outer surface of the innermost cylinder and the inner surface of the outer cylinder consists of an alloy of copper and nickel. Liquid is pumped under pressure into the innermost cylinder causing a multiplicity of jets of liquid to issue from the holes in the inner cylinder wall to bombard the copper-nickel surface of the inner wall of the outer cylinder. Electrons freed from the copper in the wall combine with both liquid molecules and particle molecules, causing the particles to separate from the liquid.

9 Claims, 1 Drawing Sheet

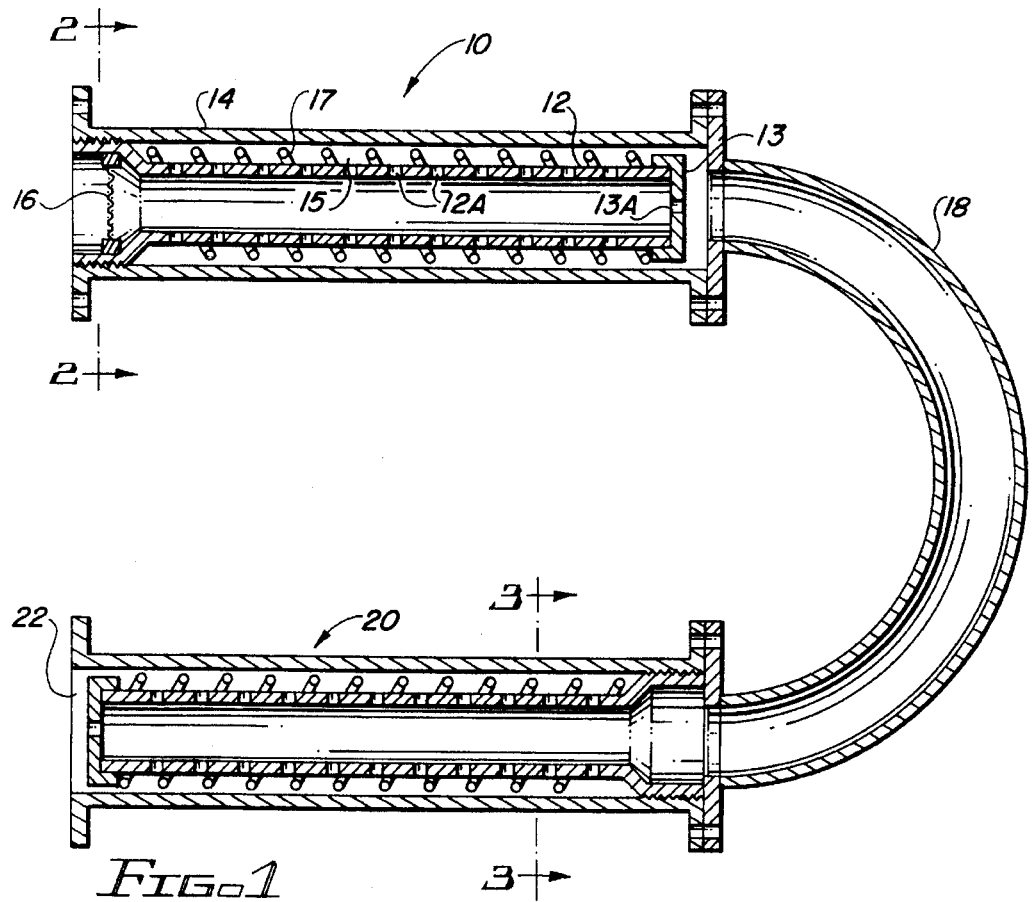
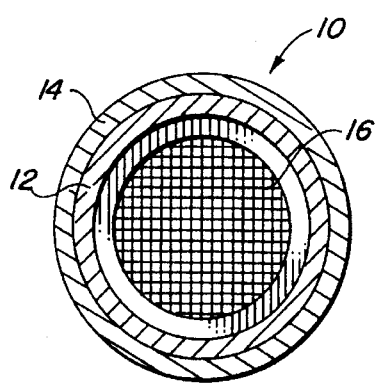
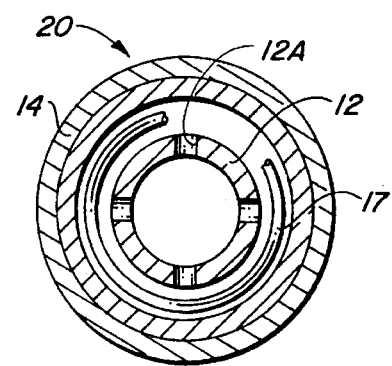

METHOD AND APPARATUS FOR SEPARATING PARTICLES FROM LIQUIDS

FIELD OF THE INVENTION

The present invention pertains to a method and apparatus for separating immiscible solid or liquid particles such as oil from a liquid-based mixture or emulsion.

BACKGROUND AND SUMMARY OF THE INVENTION

The known techniques for separating solid or liquid particles from a liquid-based mixture or emulsion include the following:

1. Decanting. Liquids having different specific gravities, i.e., oil and water, can be separated by standing in a settling tank. The lighter liquid floats to the top of the heavier liquid and can be skimmed off but it takes time for the liquid to settle. Moreover, skimming cannot avoid some water being mixed with the skimmed off oil. Typically skimmed oil contains about 15% water and the separated water about 50 parts oil per million parts water.

2. Centrifuging. Liquid or solid particles having higher specific gravities than the liquid base can be separated by spinning the emulsion in a rotating chamber whereby the heavier particles are separated by centrifugal force. Due to the weight of the spinning emulsion and the dynamic vibrations incurred, the equipment is both massive and expensive to operate.

3. Chemical Floccing. Floccing achieves separation of solid particles from a liquid by shifting the pH of the emulsion to impart an electric charge to the particles leaving both the particles and the liquid base negatively charged. Polymers carrying a positive charge are then added to the emulsion causing the negatively charged particles to draw together into a floc which can be removed from the liquid. Floccing is effective for only a narrow range of particles and once removed, the liquid must be purified.

4. Distillation. This method involves boiling the liquid and condensing the vapor. Distillation requires massive amounts of energy and is inefficient when the specific gravities of the liquid base and the solid or liquid particles are close together.

The present invention differs from the foregoing conventional methods of separating particles from liquid-based emulsions in that it not only provides rapid and inexpensive separation of the particles from the liquid but the resulting liquid has an extremely high level of purity.

The invention utilizes and combines two known scientific principles.

First, when a stream of liquid under pressure which contains solid or liquid immiscible particles is directed against the surface of a metal plate, the metal tends to give up electrons which then combine with the liquid molecules and with the particle molecules causing the similarly charged liquid and particles to repel and separate from each other.

Second, copper is a metal which readily gives up electrons and nickel in the presence of copper acts as a catalyst to enhance copper's propensity to surrender electrons when bombarded by a stream of liquid.

The invention includes a unique device we have named an Ion Collider™. The Ion Collider combines the foregoing scientific principles into a remarkably effective method of separating immiscible particles from a liquid mixture or emulsion. In its simplest form the Ion Collider consists of two spaced apart concentric metal cylinders or pipes. Either both pipes are made of copper-nickel alloy or preferably both the inner surface of the outer cylinder and the outer surface of the inner cylinder are coated with a copper-nickel alloy.

The wall of the inner cylinder contains a multiplicity of spaced apart radially bored holes and the exit end of the inner cylinder is capped. The opposite or entry end of the inner cylinder may have a filter screen to prevent entry into the Ion Collider of gravel or other large particles. The liquid is pumped under pressure into the inner cylinder causing a multiplicity of streams or jets to issue from the inner cylinder wall and bombard the inner surface of the copper-nickel wall of the outer cylinder.

Electrons freed from the copper in the walls of the annular chamber between the two cylinders combine with both the base liquid molecules and the particle molecules, causing the particles to separate from the base liquid.

BRIEF DESCRIPTION OF THE DRAWINGS

The appended drawings illustrate a preferred embodiment of our invention and are intended to supplement the description of the invention in the text of this application.

FIG. 1 is a cross sectional plan view taken through the center of two co-acting Ion Colliders.

FIG. 2 is a cross sectional elevational view taken along line 2—2 of FIG. 1.

FIG. 3 is a cross sectional elevational view taken along line 3—3 of FIG. 1.

DETAILED DESCRIPTION OF THE PREFERRED EMBODIMENTS

Referring to FIGS. 1 and 3 of the drawings, Ion Colliders 10 and 20 each include two spaced apart concentric elongated cylindrical metal pipes. Each of the pipes may be made of a copper-nickel alloy or preferably the pipes may be made of a ferrous metal and the outer surface of the inner pipe and the inner surface of the outer pipe coated with an alloy of copper and nickel as by flame coating.

Inner pipe 12 contains a plurality of spaced apart radially bored holes 12A and its exit end is closed by a cap 13 which includes at its center a hole 13A. The diameter of hole 13A of the cap is slightly larger than the diameter of the plurality of holes 12A in the inner pipe. The entry end of inner pipe 12 is joined to outer pipe 14 as shown in FIG. 1 and a filter screen 16 of copper mesh shown in FIGS. 1 and 2 is fitted into the enlarged entrance end of inner pipe 12 in order to prevent the intrusion into Ion Colliders 10 and 20 of gravel or other large particles.

Regardless of the diameter of outer pipe 14, the inner surface of outer pipe 14 is preferably spaced about one and one half inches from the outer surface of inner pipe 12. Both inner and outer pipes 12 and 14 may be made of a copper-nickel alloy in which nickel comprises at least 1% of the total volume of the pipe and copper comprises at least 80% of the volume. Preferably pipes 12 and 14 are made of black iron and the outer surface of pipe 12 and the inner surface of pipe 14 are coated with a copper-nickel alloy containing 10% nickel and 90% copper.

We have constructed and successfully operated Ion Colliders in which the diameter of pipe 14 ranges from 4 to 14 inches. But in all these Ion Colliders the distance between the outer surface of pipe 12 and the inner surface of pipe 14 was about one and one half inches, thereby creating an annular chamber 15 between pipes 12 and 14 whose surfaces consist of a copper-nickel alloy.

Liquid containing immiscible particles are pumped through filter screen 16 into pipe 12 causing a multiplicity of jets of the particle-containing liquid to issue from pipe 12 into the chamber 15 to bombard the copper and nickel coated wall of pipe 14.

Electrons freed from the walls of annular chamber 15 combine with both the liquid molecules and the particle molecules, causing the particles to separate from the liquid.

We prefer using pipes made of black iron and flame coating the outer surface of pipe 12 and the inner surface of pipe 14 with a copper-nickel alloy for two reasons. First, they are less expensive than copper and nickel alloy pipe. More importantly, flame coated pipe has a roughened irregular surface, thus presenting more surface area of copper to the turbulent action of the liquid in chamber 15 and causing the creation of more electrons surrendered from the surface of the copper.

To increase turbulence in chamber 15 between inner pipe 12 and outer pipe 14, a helix of copper or copper-nickel alloy wire 17 is wrapped between the outer surface of inner pipe 12 and the inner surface of outer pipe 14 from one end of the chamber to the other. Helical wire 17 preferably has a diameter of at least 1/16 of an inch and is wound with a frequency of not less than 1/4 of an inch and not more than 1 inch apart measured longitudinally along the axis of pipe 12.

The liquid and particles having been treated in Ion Collier 10 are then passed through U-shaped deceleration tube 18. The function of tube 18 is to create an abrupt decrease in the momentum of the stream exiting from Ion Collider 10. The cross sectional area of tube 18 is equal to or greater than the cross sectional area of inner pipe 12 of Ion Collider 10.

After passing through tube 18 the liquid stream enters Ion Collider 20 which in most respects is identical with Ion Collider 10. However, Ion Collider 20 for obvious reasons does not need a filter screen. The function of Ion Collider 20 is to further enhance the separation of the solid or liquid particles from the liquid base so that these particles can be expeditiously removed from the liquid base soon after they emerge from the discharge end 22 of Ion Collider 20.

As an example of the effectiveness of our Ion Collider, when it is used to treat a mixture or emulsion of oil particles in water, the decanted oil contains less than 1% water and the separated water about 10 parts oil per billion parts water.

While we have illustrated and described preferred embodiments of our invention, such disclosure should not be regarded as any limitation of the scope of our invention. The scope of our invention is defined in the appended claims.

We claim:

1. Apparatus for pre-treating a liquid-based mixture or emulsion containing immiscible particles to enhance the subsequent separation of the particles from the liquid comprising a first elongated metal pipe having an entry end and an exit end and a plurality of identical spaced apart holes in wall of the pipe, a cap enclosing the exit end of the pipe, a second elongated metal pipe having an entry end and an exit end whose inner diameter is greater than the outer diameter of the first pipe and is in axial alignment with and surrounds the first pipe, the first and second pipes being made of metal, the inner surface of the outer cylinder and the outer surface of the inner cylinder consisting of an exclusively copper-nickel alloy which includes at least 1% nickel and at least 80% copper, end means for joining together in axial alignment the entry ends of the first and second pipes whereby the subsequent separation of the particles from the liquid in the liquid-bases mixture or emulsion is enhanced.

2. Apparatus as set forth in claim 1 which includes a copper wire wound around the outside of the first pipe in the form of a helix.

3. Apparatus as set forth in claim 1 in which both the first and second pipes are made of a copper-nickel alloy containing 10% nickel and 90% copper.

4. Apparatus as set forth in claim 1 in which the distance between the inner pipe and the outer pipe is approximately one and one half inches.

5. Apparatus as set forth in claim 1 in which the cap has a hole lying along the axis of the first metal pipe and the hole has a diameter slightly larger than the diameter of the holes in the wall of the first pipe.

6. Apparatus as set forth in claim 1 in which the second pipe is made of black iron and its inner surface is flame coated with an alloy of copper and nickel.

7. Apparatus for pre-treating a water-based mixture or emulsion containing particles of oil to enhance the subsequent separation of the oil from the water by decanting comprising a first elongated pipe having an entry end and an exit end and a plurality of spaced apart holes in the wall of the pipe, a cap enclosing the exit end of the pipe, a second elongated pipe having an entry end and an exit end whose inner diameter is greater than and spaced from the outer wall of the first pipe and is in axial alignment with and surrounds the first pipe, the inner surface of the outer pipe and the outer surface of the inner pipe being flame coated with en alloy made exclusively of copper and nickel which consists of at least 1% nickel and at least 80% copper, and means for joining together in axial alignment the entry ends of the first and second pipes whereby the subsequent separation of the oil particles from the water in the water-based mixture or emulsion is enhanced.

8. Apparatus as set forth in claim 7 in which the first and second pipes are made of iron.

9. Apparatus as set forth in claim 7 in which the distance between the first and second pipes is about one and one half inches.

\* \* \* \* \*